US012244106B2

(12) United States Patent
Glendinning et al.

(10) Patent No.: US 12,244,106 B2
(45) Date of Patent: Mar. 4, 2025

(54) VEHICLE CABLE AND PLUG WITH INDICATOR LIGHTS AND SWITCH

(71) Applicant: Glendinning Products, LLC, Conway, SC (US)

(72) Inventors: Paul Glendinning, Myrtle Beach, SC (US); Robert Miles Glendinning, Conway, SC (US); Jimmy R. Todd, Loris, SC (US)

(73) Assignee: Glendinning Products, LLC, Conway, SC (US)

( * ) Notice: Subject to any disclaimer, the term of this patent is extended or adjusted under 35 U.S.C. 154(b) by 399 days.

(21) Appl. No.: 17/738,232

(22) Filed: May 6, 2022

(65) Prior Publication Data

US 2023/0163535 A1 May 25, 2023

Related U.S. Application Data

(60) Provisional application No. 63/361,096, filed on Nov. 24, 2021.

(51) Int. Cl.
*H01R 13/713* (2006.01)
*H01R 13/02* (2006.01)
(Continued)

(52) U.S. Cl.
CPC ......... *H01R 13/713* (2013.01); *H01R 13/025* (2013.01); *H01R 13/52* (2013.01); (Continued)

(58) Field of Classification Search
CPC .... H01R 13/025; H01R 13/52; H01R 13/665; H01R 13/713
See application file for complete search history.

(56) References Cited

U.S. PATENT DOCUMENTS 4,138,177 A * 2/1979 Van Valer .............. B60K 37/00 439/4
5,555,483 A * 9/1996 Pressman ............... H02H 3/207 340/661

(Continued)

FOREIGN PATENT DOCUMENTS

CN 111987541 * 11/2020 ............ H01R 13/66

OTHER PUBLICATIONS

Hubbell Shore Power Cable Sets—Instruction Sheet (published before 2021).

(Continued)

*Primary Examiner* — Vanessa Girardi
(74) *Attorney, Agent, or Firm* — Harness, Dickey & Pierce, PLC

(57) ABSTRACT

A vehicular electrical plug or connector is provided. In another aspect, an electrical connector includes a wire cable having a first end that is permanently connected to a wheeled recreational vehicle, a second end with an outlet-engageable plug thereon, and a switch allowing for a high potential or dielectric withstand test by the vehicle manufacturer in one switch condition, and then the switch allowing for normal use while detecting and/or alerting a user of an electrical ground and/or polarity problem in another switch condition. A further aspect of an electrical connector employs multiple lights on a plug, one of which alerts a user of an electrical ground and/or polarity problem, and another of which is illuminated when electricity is flowing through the plug. Another aspect of a vehicular electrical plug and method of manufacturing same, includes liquid polyurethane fed into a hole in a plug housing which then fills the otherwise open area therein to create a water-resistant seal for the plug.

22 Claims, 10 Drawing Sheets

(51) Int. Cl.

| | |
|---|---|
| ***H01R 13/52*** | (2006.01) |
| ***H01R 13/66*** | (2006.01) |
| ***H01R 13/717*** | (2006.01) |
| *H01R 107/00* | (2006.01) |

(52) U.S. Cl.
CPC ....... *H01R 13/665* (2013.01); *H01R 13/7175* (2013.01); *H01R 2107/00* (2013.01); *H01R 2201/26* (2013.01)

(56) References Cited

U.S. PATENT DOCUMENTS 6,259,170 B1 * 7/2001 Limoge .................. B60Q 1/305 439/490
7,433,197 B2 * 10/2008 Steele .................... H05K 5/064 361/767
7,959,444 B2 * 6/2011 Corless .................. H01R 13/72 439/906
2021/0273447 A1 9/2021 Thomas

OTHER PUBLICATIONS

Hubbell 50 Amp Ship-to-Shore Devices and Cable Sets—Catalogue (published before 2021).
Hubbell 50 Amp Ship-to-Shore Cable Sets—Internet Page (published before 2021).
Furrion Lippert RV Cordset Catalogue (published before 2021).
Marinco EEL Cordset Catalogue (published before 2021).
Glenndinning Cablemaster model CRR-50LP brochure (published before 2021).
CRR-50—Installation Manual (published Apr. 27, 2022).
PV Power Cable—Glendinning (published Apr. 25, 2022).
RV Power Cable Handling Cablemaster, Glendinning Products (published Apr. 25, 2022).

* cited by examiner

VEHICLE CABLE AND PLUG WITH INDICATOR LIGHTS AND SWITCH

CROSS-REFERENCE TO RELATED APPLICATION

The present application claims priority to U.S. provisional patent application Ser. No. 63/361,096 filed on Nov. 24, 2021, which is incorporated by reference herein.

BACKGROUND AND SUMMARY

The present disclosure relates generally to electrical connectors and more particularly to a vehicular electrical plug.

Conventional recreation vehicles ("RVs"), such as motor home coaches, employ an electrical cordset which includes a power wire cable with a plug at an end thereof. The plug is removably coupled to a stationary and remote, post-mounted electrical outlet. Some traditional plugs have a single light thereon that is illuminated when the plug is coupled to the outlet and power is flowing through the wire cable. These traditional devices, however, do not indicate if there is an electrical ground or polarity problem.

A much more complicated and expensive version is disclosed in U.S. Patent Publication No. 2021/0273447 entitled "Recreational Vehicle Power Monitoring and Reporting Device and Method" which published to Thomas on Sep. 2, 2021, and is incorporated by reference herein. This device disadvantageously has a power conditioner module, with a surge protector, that is independent from a power monitoring module. Furthermore, the power monitoring module includes memory and a microprocessor running software to calculate power load imbalances, compile databases of power offered by various RV parks, wirelessly communicate to remote user devices, receive GPS locational information, and interface with cloud memory or a host computer network. However, this complexity, extreme cost and component size are undesirable and not needed in most situations, and the many lights thereon confuse the RV user.

In accordance with the present invention, a vehicular electrical plug or connector is provided. In another aspect, an electrical connector includes a wire cable having a first end that is permanently connected to a wheeled recreational vehicle, a second end with an outlet-engageable plug thereon, and a switch allowing for a high potential or dielectric withstand test by the vehicle manufacturer in one switch condition, and then the switch allowing for normal use while detecting and/or alerting a user of an electrical ground and/or polarity problem in another switch condition. A further aspect of an electrical connector employs multiple lights on a plug, one of which alerts a user of an electrical ground and/or polarity problem, and another of which is illuminated when electricity is flowing through the plug. Another aspect of a vehicular electrical plug and method of manufacturing same, includes liquid polyurethane fed into a hole in a plug housing which then fills the otherwise open area therein to create a water-resistant seal for the plug.

The present vehicle electrical plug is advantageous over conventional devices. For example, the present plug is multifunctionally and synergistically beneficially for use in both a high potential or dielectric withstand test by the vehicle manufacturer in one switch condition, and then normal use while detecting and/or alerting a user of an electrical ground and/or polarity problem in another switch condition. The present apparatus is also advantageous by being a single assembled part with one end permanently attached to the vehicle. Moreover, the present plug is much less expensive and easier to use than traditional devices, yet which alerts a user to ground and/or polarity electrical problems. Additional advantages and features of the present apparatus and method will become apparent from the following description and appended claims, taken in conjunction with the associated drawings.

DETAILED DESCRIPTION

Figure 1:
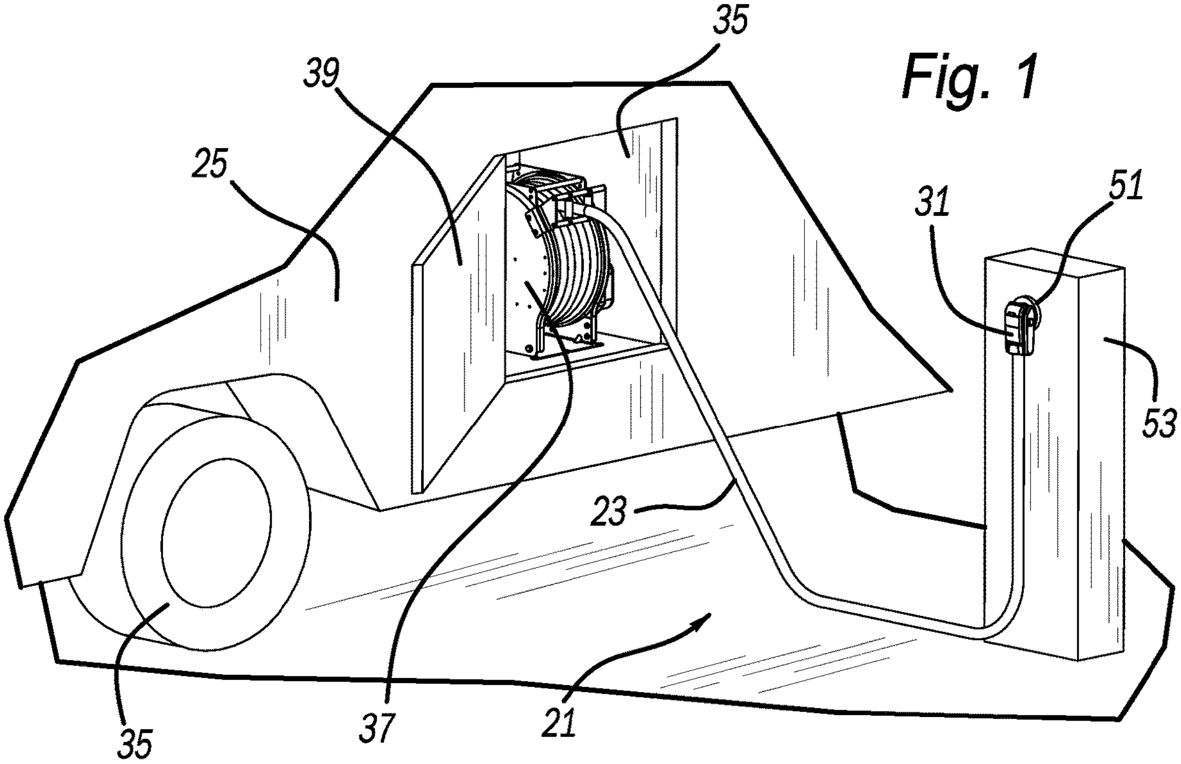
FIG. 1 is a perspective view showing a recreational vehicle with the present electrical plug.
Figure 2:
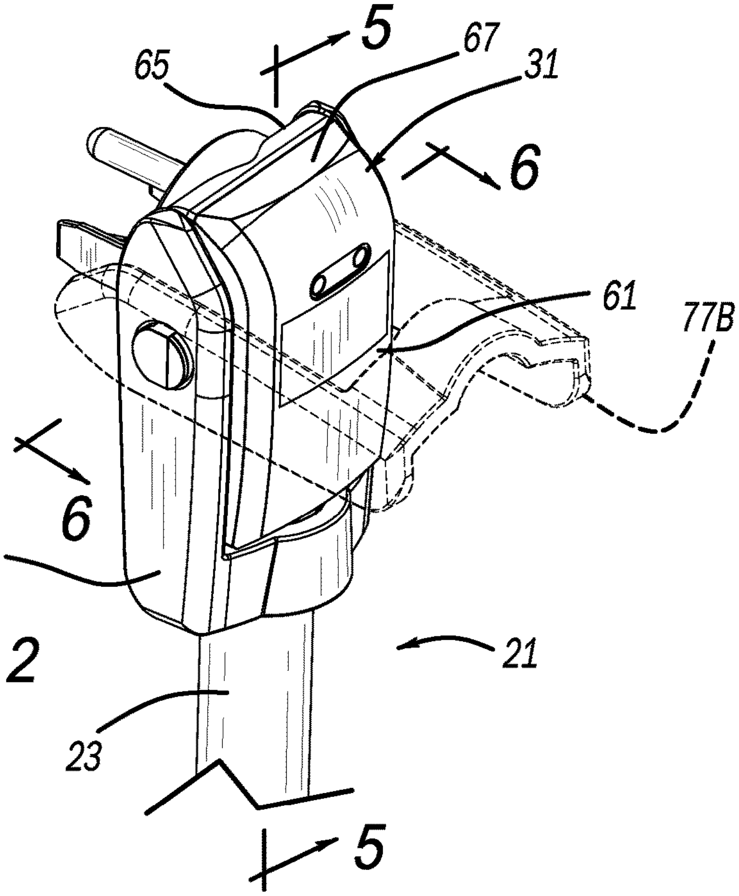
FIG. 2 is a perspective view showing the present electrical plug.
Figure 3:
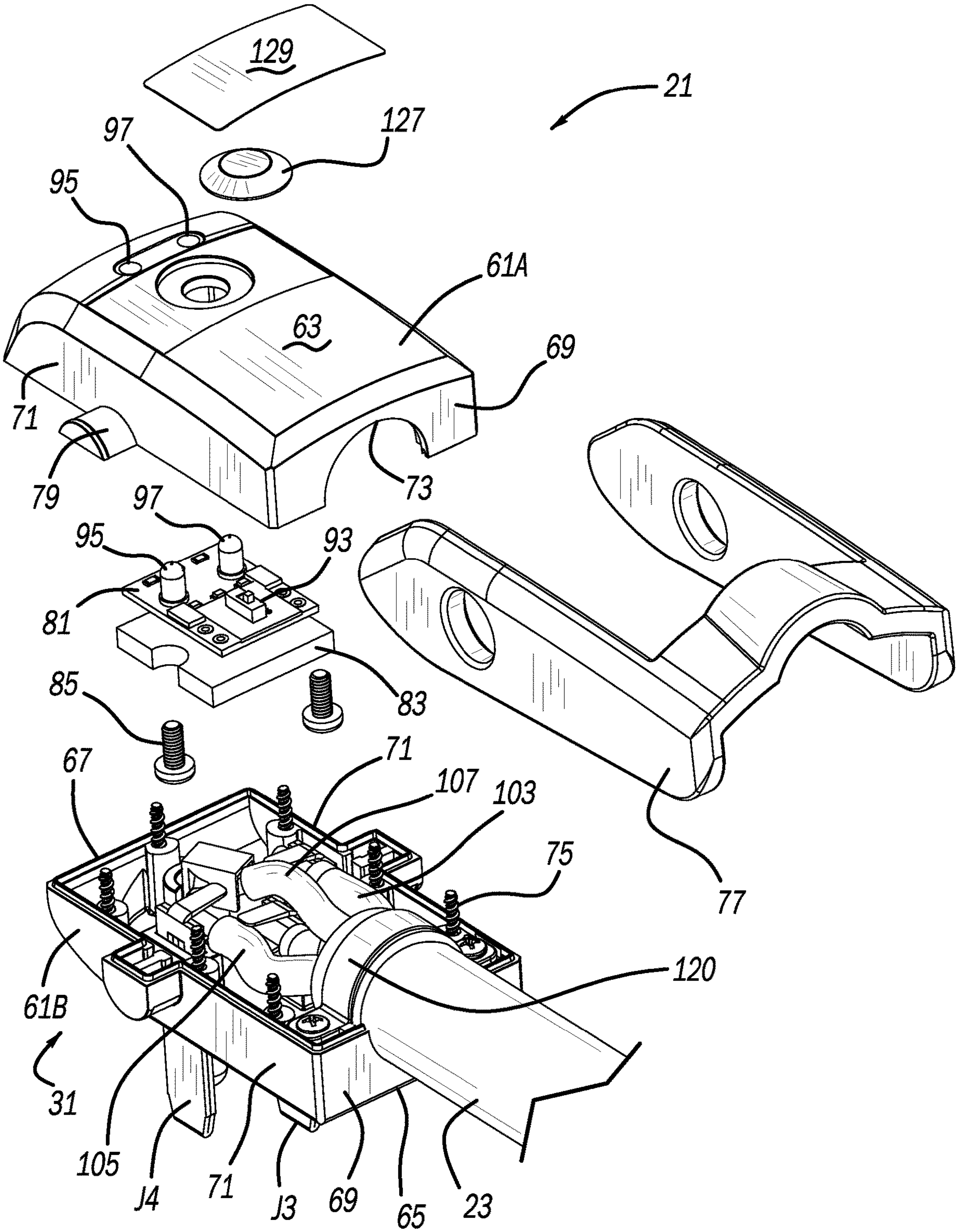
FIG. 3 is an exploded perspective view showing the present electrical plug.
Figure 4:
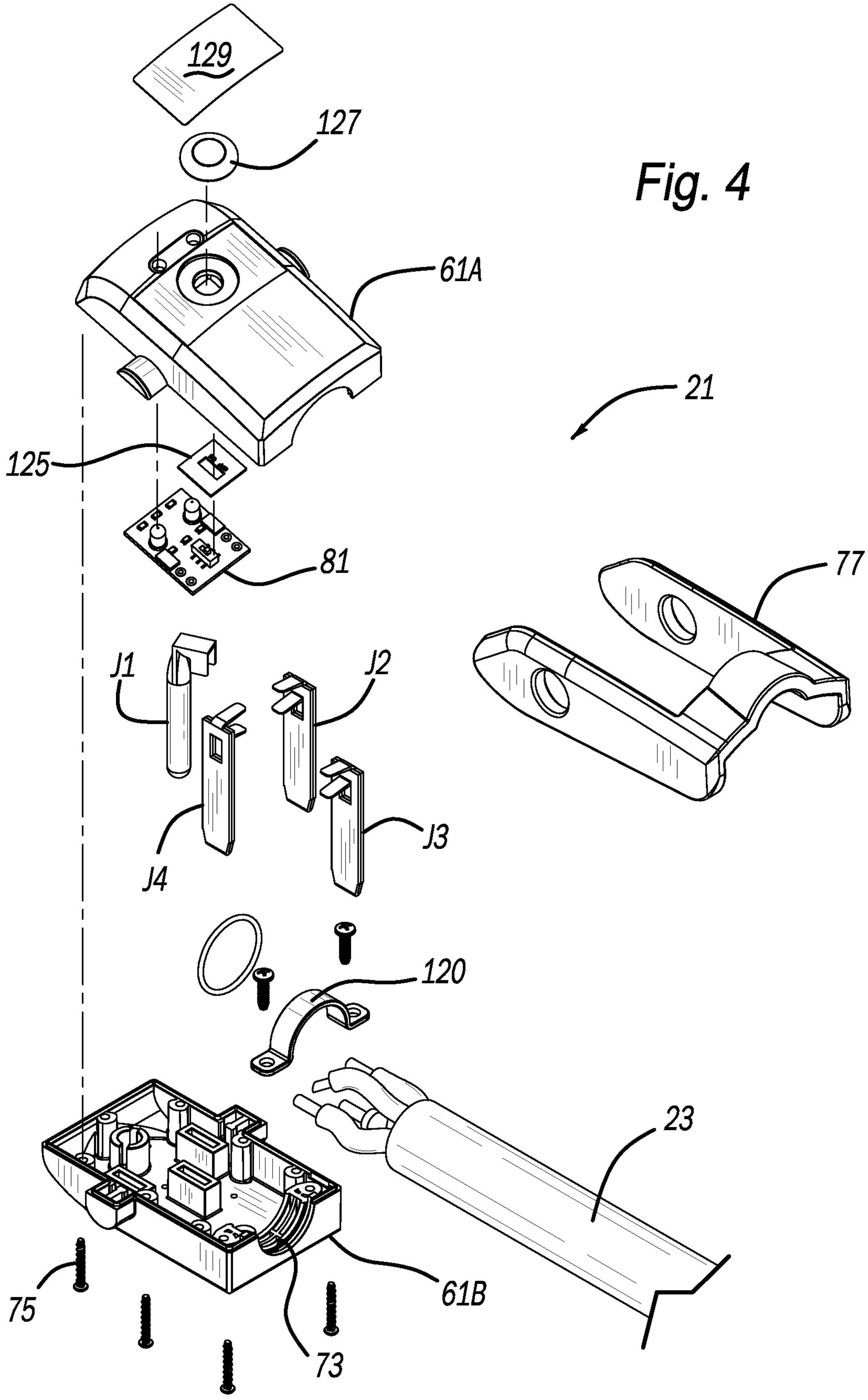
FIG. 4 is a an exploded perspective view showing the present electrical plug.
Figure 5:
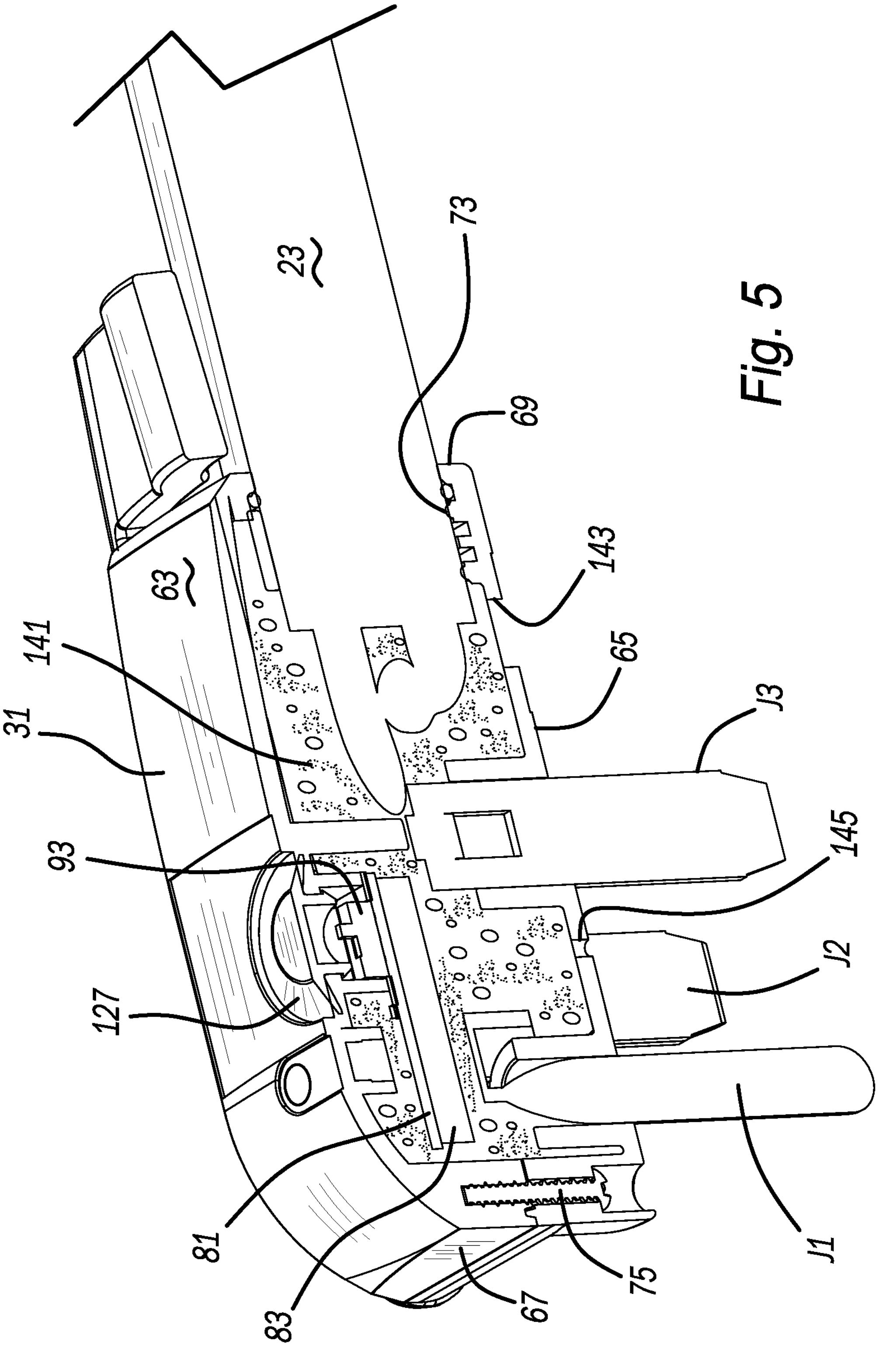
FIG. 5 is a cross-sectional view, taken along line 5-5 in FIG. 2, showing the present electrical plug.
Figure 6:
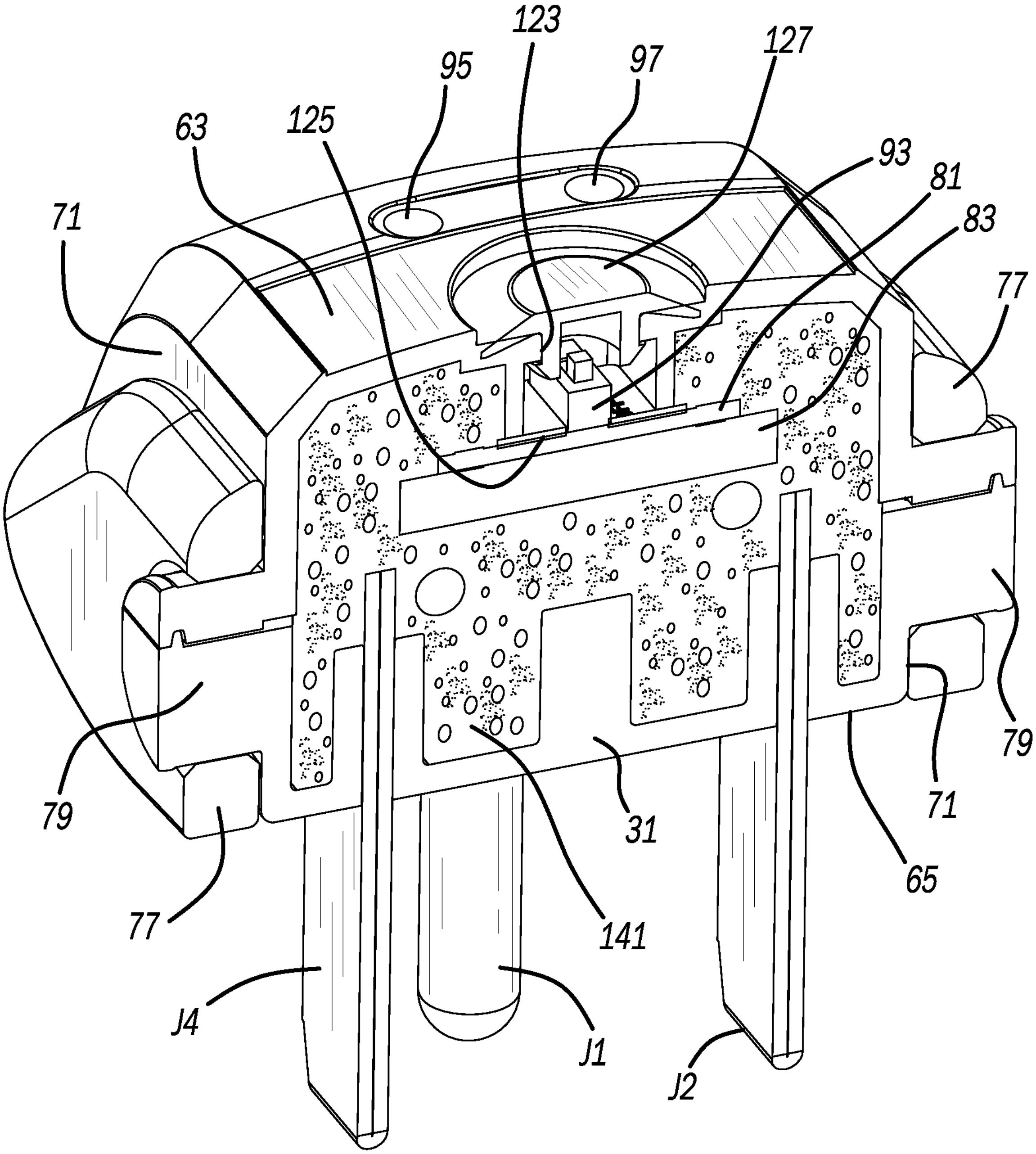
FIG. 6 is a cross-sectional view, taken along line 6-6 in FIG. 2, showing the present electrical plug.
Figure 7:
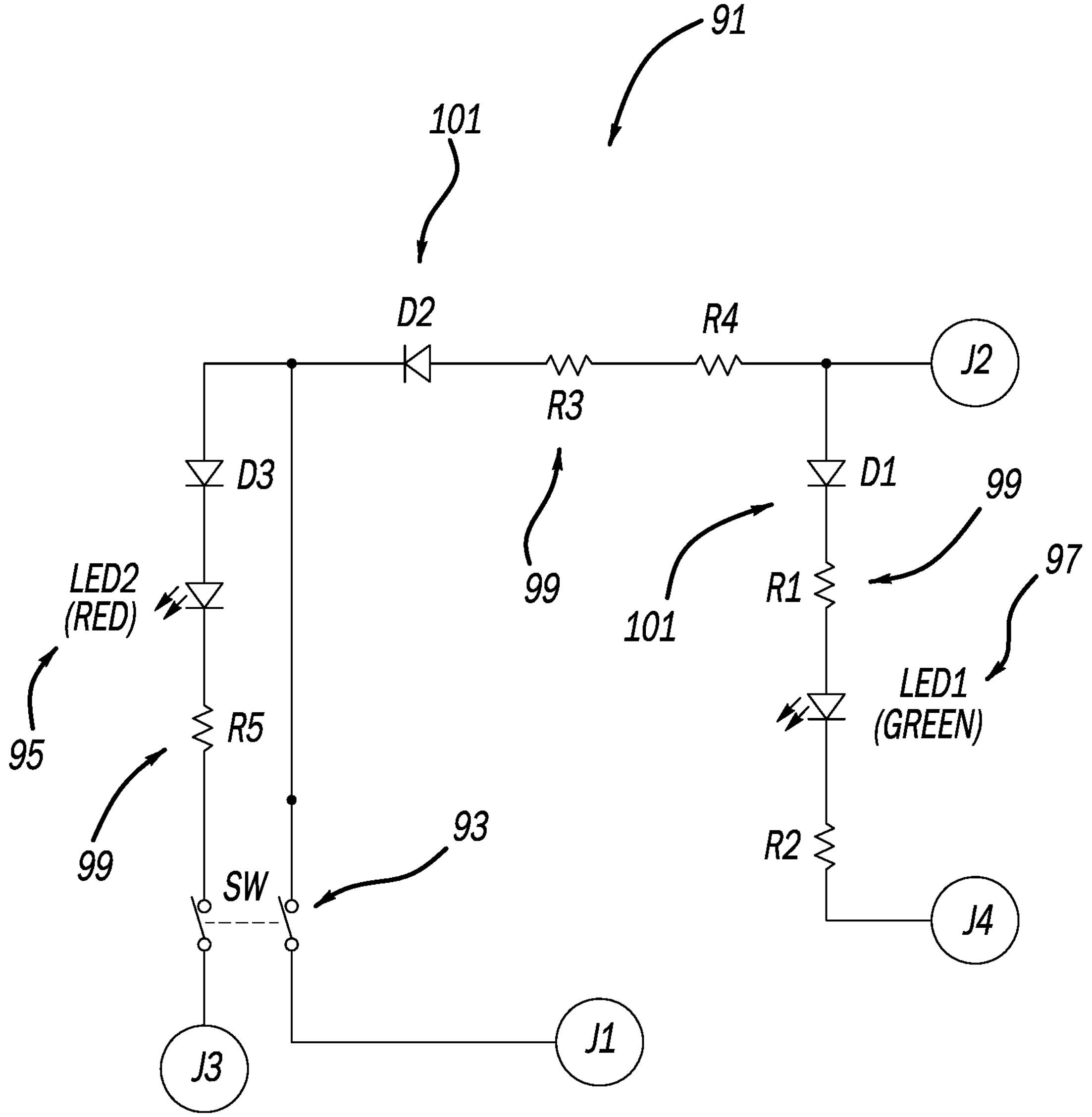
FIG. 7 is an electrical circuit diagram showing the present electrical plug.

A preferred embodiment of a vehicular electrical connector 21 is shown in FIG. 1, and includes a wire cable 23 having a first end connected to a wheeled recreational vehicle 25 and an opposite second end with an electrical plug 31 thereon. Recreational vehicle 25 is preferably a motor home coach, camper van, travel trailer, fifth-wheel trailer, popup camper or the like, having wheels 33 and an internal sleeping bed. It may be self-propelled with an engine or towed. A cavity 35 is located in a side of recreational vehicle 25 and optionally contains a manually cranked or electric motor-driven winch 37 having a drum mounted upon a shelf therein, and enclosed by a pivoting door 39. Wire cable 23 is wrapped or coiled around the drum of winch 37, which may be extended or retracted, and the first end of the wire cable is permanently connected to an electrical circuit of the recreational vehicle; in other words, the first end it not intended to be removed therefrom without disassembling or severing it. When wire cable 23 is extended for use, plug 31 is removably connected to a remotely located and stationary NC power outlet 51 mounted on an upstanding post 53 or building.

Referring to FIGS. 2-7, plug 31 includes an injection molded polymeric housing 61 having an outer housing shell 61A and an inner housing shell 61B. Housing 61 is defined by a slightly convexly curved outside surface 63, an opposite and generally flat inside surface 65, a top surface 67, a bottom surface 69, and generally flat and parallel side surfaces 71. Wire cable 23 extends through an aperture 73 in bottom surface 69. Furthermore, screws 75 or rivets fasten together housing shells 61A and B.

A generally U-shaped and polymeric lever 77 is manually rotatable about pivots 79, which laterally project from side surfaces 71. Lever 77 is movable between a nominal position 77A aligned with side surfaces 71 and an offset angled position 77B. This allows lever 77 to assist in pushing away and releasing plug 31 from remote outlet 31.

A printed circuit board 81 and underlying flexible silicone insulator pad 83, are fastened to upper housing shell 61A via screws 85. An electrical circuit 91 of printed circuit board 81 includes a disconnect switch 93, two LED lights 95 and 97, resistors 99 and diodes 101. At least three and more preferably five, resistors 99, and at least three diodes, are employed in the circuit. Conductive metal terminals or lugs are also part of circuit 91 and include a pair of electrically positive junction terminals J2 and J4, an electrical ground junction terminal J1, and a neutral junction terminal J3. Positive power wires 103 and 105, of cable 23, are crimped, soldered or otherwise fastened onto terminals J2 and J4, respectively, while grounding wire 107 is fastened to terminal J1.

The terminals all project through slots in inside surface 65 of the housing and extend generally parallel to each other and generally perpendicular to the inside surface. Wire cable 23 is secured to inner housing shell 61B by a curved band 120 screwed to the shell. This cordset handles 50 amps and 125/250 volts of NC power, but can alternately be used for different power configurations.

A slidable button 121 (see FIG. 13) of switch 93 is accessible through an opening 123 in outside surface 63 of plug housing 61. Switch 93 is a double pull, double throw, on-on, surface mount 300 mA switch. It is preferred that no microprocessor be included in the plug to reduce expense.

Furthermore, a position indicating bezel 125 is located between a body of switch 93 and an interior of outer housing 61A/opening 123. A polymeric cap 127 is removably attachable to cover opening 123 via barbed snap-fit legs projecting from the body of the cap. Additionally, a pressure sensitive adhesive backed label 129 is secured within a recess in outer surface 63 of outer housing 61A to cover and further retain cap 127.

The operation of the present electrical plug apparatus 21 will now be described with reference to FIGS. 8-14. RV plug 31 shows the user the status of their 50 amp, 125/250 v AC power. It shows power available by a green LED 95 and also shows reverse polarity or loss of ground conditions by a red LED 97. The power status circuitry can be disconnected from the power wires by a switch (mechanical or magnetically controlled). During RV production testing (by the manufacturer), specifically dielectric withstand test ("HiPot"), circuitry cannot be connected to the power conductors. However, the present apparatus design allows this circuitry to be disconnected during testing and then after testing is performed, switch 93 is switched to ON which allows the power status LED to operate.

Figure 8:
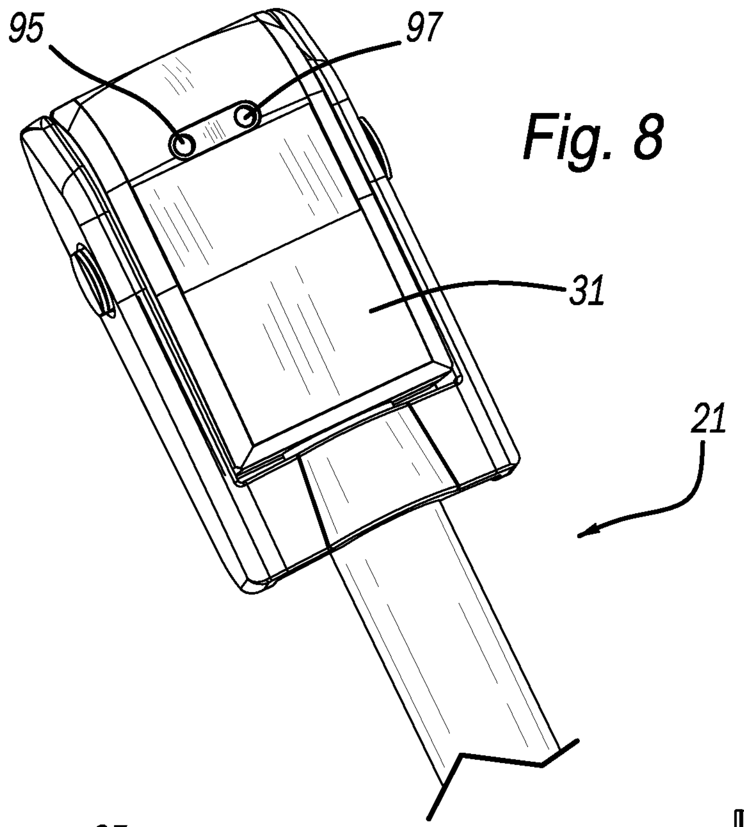
FIG. 8 is a perspective view showing the present electrical plug, in a first condition.
Figure 9:
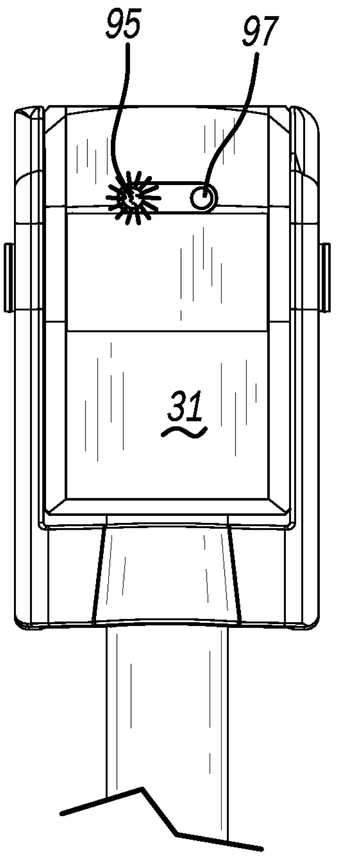
FIG. 9 is a front elevational view showing the present electrical plug, in a second condition.
Figure 10:
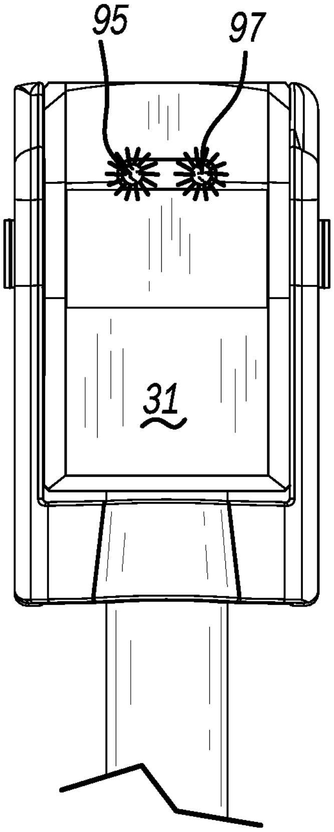
FIG. 10 is a front elevational view showing the present electrical plug, in a third condition.

More specifically, FIG. 8 shows the LED lighting condition of the plug before it is plugged into an RV park pedestal our post-mounted outlet; both LEDs 95 and 97 are not illuminated. When the plug is plugged into the RV park pedestal outlet under normal power transmission conditions, green LED 95 is ON and illuminated, as is illustrated in FIG. 9. Then, when a reverse polarity or loss of ground condition is detected by the plug's electrical circuit, the red LED 97 is also ON and illuminated.

Figure 11:
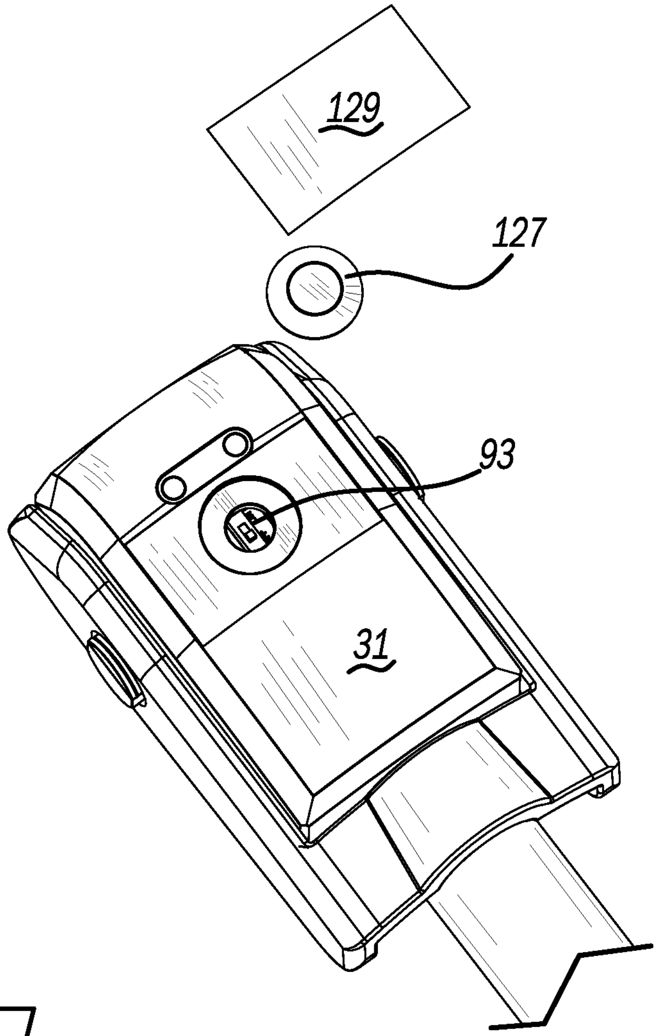
FIGS. 11-14 are perspective views showing a series of steps for using the present electrical plug.
Figure 12:
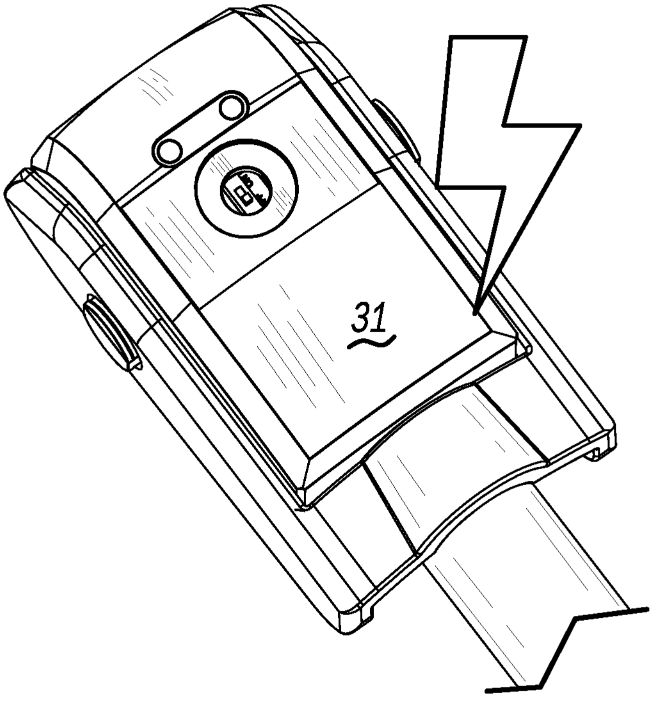
Figure 13:
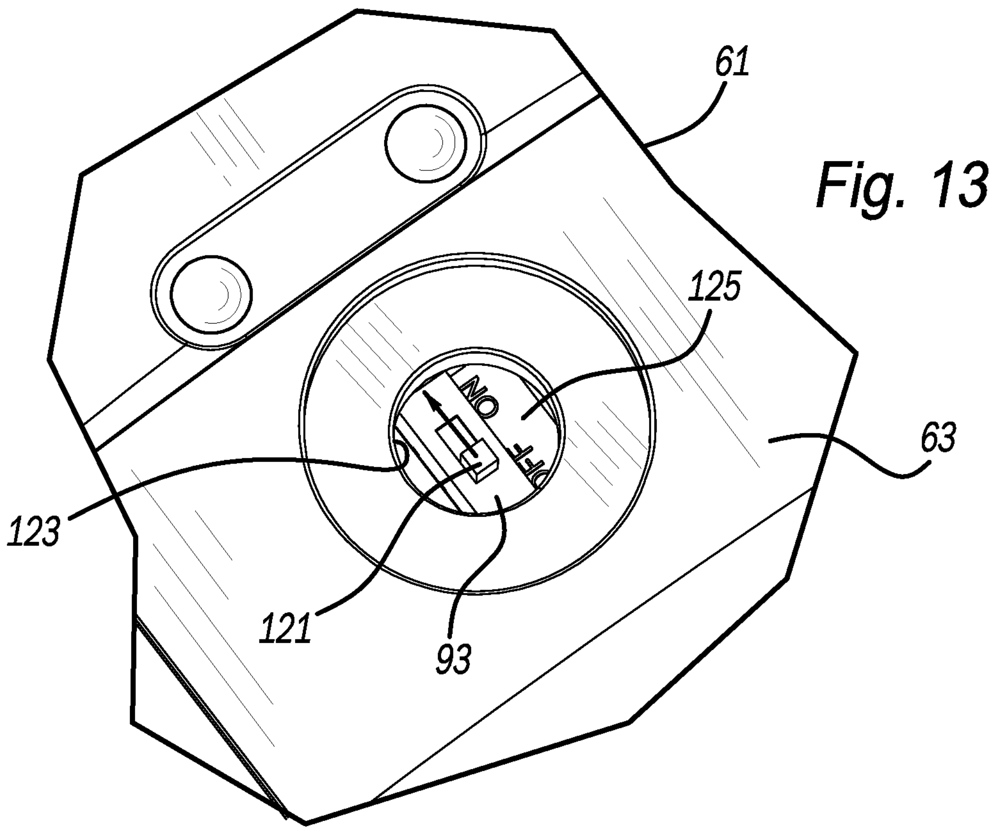

FIGS. 11 and 13 show the initial situation where an RV manufacturer OEM receives plug 31 with cap 127 and label 129 in a bag taped to the plug. Button 121 of switch 93 is in the OFF position. Next, the manufacturer performs normal coach dielectric testing (HiPot Test) per FIG. 12. The HiPot high potential test checks for good isolation such that no electrical current will flow from one point to another in an over-voltage transient situation. This allows the manufacturer to determine if there are any crushed insulation, stray wire strands, corrosive contaminants around conductors, terminal spacing problems or cable tolerance issues, in the RV's internal circuits. The manufacturer test, with switch 93 open, further will include: a continuity test to ensure that all metal parts are properly bonded; an operational test to demonstrate that all equipment is properly connected and in working order; polarity checks to determine that connections have been properly made; and/or GFCI testing to demonstrate that the ground fault protection devices are installed and operating properly. It is preferred that the electrical power connector be permanently connected to the RV during this HiPot test.

Figure 14:
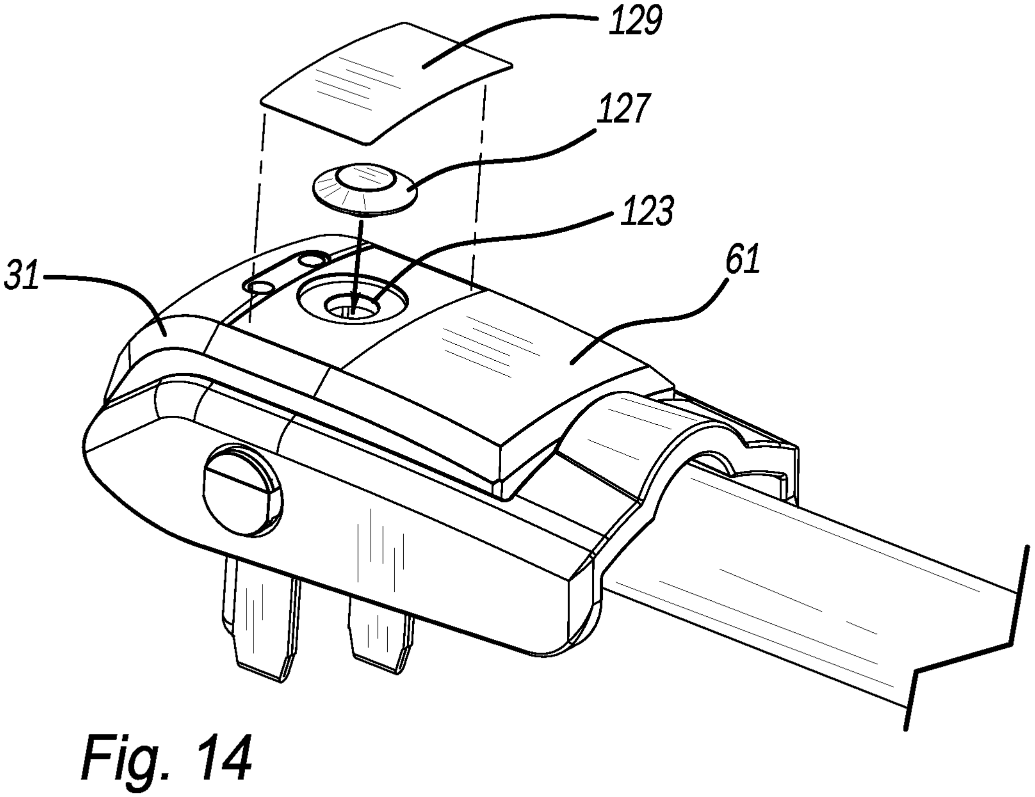

After the testing is performed by the RV manufacturer, and with reference to FIG. 13, the manufacturer will manually slide button 121 of switch 93 in the direction of the illustrated arrow to the ON position (toward the LEDs) using a screwdriver tool. Next, FIG. 14 illustrates that the manufacturer will install waterproof cap 127 into hole of housing 61 by snapping it into place. Label 129 is then affixed to housing 61 of plug 31. There is a slight pocket or recess that guides the label in place and this label is a permanent heavy duty vinyl label. Subsequently, plug 31 is ready for normal customer use in the RV and no further operation of the switch is desired thereafter. Therefore, the present electrical circuit synergistically provides the manufacturing testing switch in addition to the multiple LED lights indicating and alerting the user of a normal power operation and detected undesired power grounding/polarity reversal problem. This multi-functionality is all performed in a single assembled part that is relatively light weight and inexpensive, and easy for the user to understand.

An additional optional feature includes use of a two-part, polyurethane potting compound 141 within plug 31. Polyurethane 141 is fed or poured in a generally liquid state into an entry hole 143 in inner surface 65 of inner housing shell 61B via a dispensing gun or valved feeding conduit. Moreover, at least one exit hole 145 is also located in the inner housing shell to allow the outflow of air. Thus, the polyurethane fills all of the air gap spaces otherwise present within housing 61 and provides a water-resistant seal for all holes, openings and apertures of housing when the polyurethane cures and solidifies, which is especially beneficial for the outdoor and all weather use of the plug. Polyurethane 141 also synergistically forms an electrical and thermal insulator while additionally providing shock absorbing resistance to electronic components therein.

Figure 15:
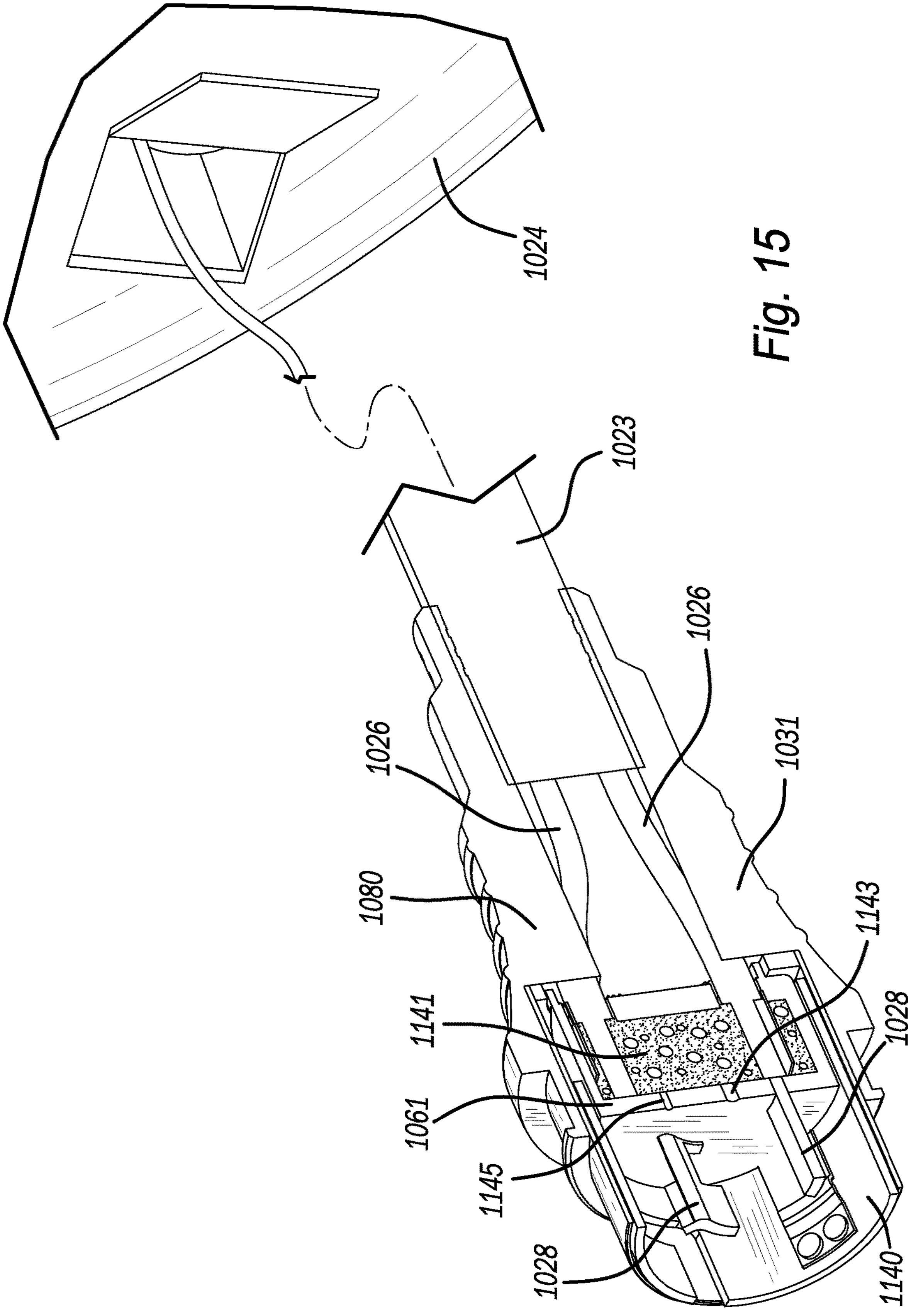
FIG. 15 is a cross-sectional view showing a marine vehicle version of the present electrical plug.

This polyurethane feature can alternately be used for an outdoor power supply in marine applications, as is illustrated in FIG. 15. A plug 1031 is coupled to a wire cable 1023 longitudinally extending from a housing 1061. The wire cable, in turn, is permanently secured to an electrical circuit of a watercraft vehicle 1024, such as a recreational boat, or removably attachable to an outlet receptable of the watercraft vehicle. A winch having a cylindrical drum, around which the cable is coiled, can optionally be employed.

The marine plug 1031 includes four wires 1026 which are crimped or sonically welded to terminals 1028 which longitudinally project from a distal end of the plug opposite wire cable 1023. At least one of the terminals has a lateral curve, and the terminals are removably connected to a remote and stationarily-mounted power supply outlet, such as on a dock or building. The wires and attached terminals are assembled into a two-part housing 1061 which has a generally circular exterior shape. A ring and sleeve 1140 are placed around the housing, and then a two-part polyurethane potting compound 1141 is fed into an entry hole 1143. Air exit holes 1145 are also provided. Polyurethane 1141 fills the otherwise present air gap within housing 1061 to provide a waterproof seal. The polyurethane-filled housing and cable are subsequently placed into an injection mold and then overmolded with an exterior PVC polymer to create a user graspable base 1080. Base 1080 includes a tapered proximal end surrounding a portion of cable 1023 and has a generally circular exterior shape with circumferential grooves and/or ribs thereon.

While various embodiments of the present electrical apparatus have been disclosed, it should be appreciated that other variations may be made. For example, alternate electrical circuits and electronic components may be used although some of the present benefits may not be realized. Furthermore, different materials and manufacturing process steps can be used, however, certain of the present benefits may not be achieved. For example, it is also envisioned that the present HiPot testing switch button may be rotated via a screwdriver-receiving slot, rather than linearly slid, between its open and closed electrical positions. As another example, the plug may or may not include the disclosed lever and polyurethane seal. Moreover, the polyurethane entry and exit holes may be in different surfaces of the housing, the housing can be differently shaped, and for use with different electrical power values, although some of the preferred advantages may not be obtained. The features of any of the embodiments may be mixed and matched in an interchangeable manner with any of the other embodiments disclosed herein, and the claims can be multiply dependent on any or all of the others. Various changes and modifications are not to be regarded as a departure from the spirit or the scope of the present invention.

The invention claimed is:

1. A vehicular electrical connector apparatus comprising:
- an electrical connector comprising a flexible wire cable having a first end that is configured to be permanently connected to a recreational vehicle;
- a remote outlet-engageable electrical plug mounted on a second end of the electrical connector;
- an electrical circuit attached to the electrical connector including multiple lights and a switch;
- the switch allowing for a high potential test in a first switch condition; and
- the switch allowing for normal power supply use, while being configured to change an illumination state of at least one of the lights when an electrical ground problem and/or a polarity problem is detected, in a second switch condition.

2. The apparatus of claim 1, further comprising:
- a housing of the plug including the switch and lights therein and having the lights visible externally from the housing;
- resistors of the electrical circuit located in the housing;
- conductive terminals having proximal ends within the housing and distal ends projecting externally from the housing; and
- polyurethane filling otherwise open space within the housing to create a water resistant seal.

3. The apparatus of claim 2, wherein the urethane is configured for injection into an entry hole in the housing, and an exit hole in the housing is configured to allow air to exit therefrom during injection of the urethane, the exit hole being smaller than the entry hole.

4. The apparatus of claim 1, wherein the switch is manually moved and hidden by a switch cover after a manufacturer of the recreational vehicle conducts the high potential test.

5. The apparatus of claim 4, wherein the recreational vehicle is a wheeled motor home coach.

6. The apparatus of claim 1, further comprising a winch including a cylindrical drum around which the wire cable is coiled, the plug includes four conductive terminals which extend in a substantially parallel manner from an inside wall of the plug with the lights being on an opposite outside wall of the plug, and the wire cable extending from an aperture in a bottom end of the plug spanning between the inside wall and the outside wall.

7. The apparatus of claim 6, wherein the plug further comprises a housing surrounding the switch and a substantially U-shaped lever being pivotally coupled to side walls of the housing, the side walls being substantially straight and parallel to each other and the inside wall having a substantially flat section perpendicular to the side walls, and the lights being only a pair of LEDs laterally spaced apart from each other and also inwardly spaced between the side walls.

8. A vehicular electrical connector apparatus comprising:
- a wheeled recreational vehicle;
- an electrical connector comprising an external power cable having a first end that is permanently connected to the recreational vehicle;
- an electrical plug mounted on a second end of the electrical connector including four conductive terminals projecting from an inside housing surface of the electrical plug;
- multiple lights visible from an outside housing surface of the electrical plug, the outside housing surface being opposite to the inside housing surface, and a bottom housing surface connecting the outside and inside housing surfaces with an aperture therein through which the power cable extends;
- a manually moveable switch coupled to the plug;
- the switch allowing for a dielectric withstand test in a first switch position; and
- the switch allowing for normal power supply use in a second switch position, while changing an illumination state of at least one of the lights when at least one of: an electrical ground problem or a polarity problem is detected.

9. The apparatus of claim 8, further comprising a switch cover removably attached to the outside surface of the plug to cover the switch after a manufacturer of the recreational vehicle conducts the test.

10. The apparatus of claim 8, further comprising a cylindrical drum around which the wire cable is wound, the drum being located within a storage cavity of the recreational vehicle, and at least two of the terminals are positive, and a circuit board being located inside the plug with the switch and the lights being connected to one side of the circuit board, and the other side of the circuit board facing the terminals.

11. The apparatus of claim 8, wherein the lights are solely a pair of LEDs laterally spaced apart from each other and also inwardly spaced between opposite side housing surfaces of the plug, and the switch is accessible through an opening in the outside housing surface of the plug.

12. The apparatus of claim 8, further comprising polyurethane filling otherwise open space within the plug to create a water resistant seal.

13. The apparatus of claim 12, wherein the urethane is configured for injection into an entry hole in plug housing, and an exit hole in the plug is configured to allow air to exit therefrom during injection of the urethane, the exit hole being smaller than the entry hole.

14. A vehicular electrical connector apparatus comprising:

a wheeled recreational vehicle-electrical power cable;

an electrical plug mounted on an end of the cable including remote outlet-connecting conductive lugs projecting from an inside surface of the electrical plug;

multiple lights visible from an outside surface of the electrical plug, the outside surface being opposite to the inside surface, and an edge surface connecting the outside and inside surfaces, the edge surface having an aperture therein through which the cable extends;

a manually moveable switch located inside the plug and being accessible through an opening in the outside surface of the plug;

the switch allowing for a dielectric withstand test when in a first switch position;

the switch allowing for normal power supply use when in a second switch position;

a switch cover removably attached to the outside surface of the plug to cover the opening and the switch after the dielectric withstand test is conducted; and a circuit board located inside the plug with the switch and the lights being connected to one side of the circuit board, and the other side of the circuit board facing the lugs.

15. The apparatus of claim 14, wherein:

the switch changes an illumination state of at least one of the lights when an electrical ground problem and/or a polarity problem is detected, when in the second switch position, which is a switch closed position; and the first switch position is a switch open position.

16. The apparatus of claim 15, wherein the lights are solely a pair of horizontally spaced apart lights and the changed illumination state is illuminating a red one of the lights when either of the electrical ground problem or the polarity problem is detected by an electrical circuit within the plug, the electrical circuit including resisters on the circuit board but not a microprocessor.

17. A vehicular electrical connector apparatus comprising:

a vehicular electrical connector comprising a flexible wire cable;

a remote outlet-engageable electrical plug mounted on a second end of the electrical connector, the electrical plug including multiple conductive terminals extending through a housing, the wire cable also extending through the housing;

an electrical circuit located within the housing, the electrical circuit including a circuit board and electronic components connected to the circuit board; and polyurethane filling otherwise open space within the housing to create a water-resistant seal;

the polyurethane being configured for injection into an entry hole in the housing, and an exit hole in the housing being configured to allow air to exit therefrom during injection of the polyurethane, the exit hole being smaller than the entry hole.

18. The apparatus of claim 17, wherein the electronic components comprise a switch, lights and resistors, and the wire cable supplies AC external power to the vehicle.

19. The apparatus of claim 17, further comprising:

a switch located in the housing and an opening located in an external surface of the housing for externally accessing the switch;

the terminals extending through an internal surface of the housing;

the switch and the electronic components including a light, located on one side of the circuit board, and the terminals being adjacent an opposite side of the circuit board with the polyurethane between the circuit board and the terminals; and the entry and exit holes being located through the internal surface of the housing.

20. The apparatus of claim 17, wherein the vehicle is a wheeled motor home, recreational vehicle, and the wire cable supplies AC external power to the recreational vehicle.

21. The apparatus of claim 17, wherein the vehicle is a watercraft, and the wire cable supplies AC external power to the watercraft.

22. The apparatus of claim 17, further comprising:

the circuit board being fastened to the polyurethane-filled housing, and the polyurethane-filled housing and an adjacent portion of the wire cable being overmolded within an exterior polymer;

the electrical components on the circuit board comprise a moveable switch, lights, resistors and diodes; and the wire cable being coiled about a drum of a winch.

* * * * *